(12) United States Patent
Kim et al.

(10) Patent No.: US 11,591,706 B2
(45) Date of Patent: *Feb. 28, 2023

(54) ELECTROLYTIC COPPER FOIL HAVING EXCELLENT HANDLING CHARACTERISTICS IN POSTPROCESSING, AND MANUFACTURING METHOD THEREFOR

(71) Applicant: SK NEXILIS CO., LTD., Jeongeup-si (KR)

(72) Inventors: Seung Min Kim, Anyang-si (KR); Shan Hua Jin, Anyang-si (KR)

(73) Assignee: SK NEXILIS CO., LTD., Jeongeup-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/959,352

(22) PCT Filed: Jan. 25, 2019

(86) PCT No.: PCT/KR2019/001069
§ 371 (c)(1),
(2) Date: Jun. 30, 2020

(87) PCT Pub. No.: WO2019/151718
PCT Pub. Date: Aug. 8, 2019

(65) Prior Publication Data
US 2021/0025066 A1    Jan. 28, 2021

(30) Foreign Application Priority Data
Jan. 31, 2018 (KR) .................. 10-2018-0012179

(51) Int. Cl.
*C25D 7/06* (2006.01)
*C25D 1/04* (2006.01)
(Continued)

(52) U.S. Cl.
CPC ............ *C25D 1/04* (2013.01); *C25D 3/38* (2013.01); *C25D 7/0614* (2013.01); *H01M 4/13* (2013.01);
(Continued)

(58) Field of Classification Search
None
See application file for complete search history.

(56) References Cited

U.S. PATENT DOCUMENTS 10,547,081 B2 *  1/2020 Kim ............... H01M 10/0525
2007/0098910 A1   5/2007 Yamagata et al.
(Continued)

FOREIGN PATENT DOCUMENTS

| CN | 106048666 A | 10/2016 |
| CN | 106536791 A | 3/2017 |

(Continued)

OTHER PUBLICATIONS

International Search Report for related International Application No. PCT/KR2019/001069; report dated Aug. 8, 2019; (5 pages).
(Continued)

*Primary Examiner* — Seth Dumbris
(74) *Attorney, Agent, or Firm* — K&L Gates LLP

(57) ABSTRACT

The present invention relates to an electrolytic copper foil having excellent handling characteristics in the manufacture of copper foil and in post-processing for manufacturing a secondary battery. The present invention provides an electrolytic copper foil having a first surface and a second surface, wherein the texture coefficient of the (220) plane of the electrolytic copper foil is 0.4-1.32, the difference (|Δ(Rz/Ra)|) between Rz/Ra on the first surface and Rz/Ra on the second surface, of the electrolytic copper foil, is less than 2.42, and the difference (|ΔPD|) in peak density (PD)
(Continued)

between the first surface and the second surface, of the electrolytic copper foil, is 96 ea or less.

10 Claims, 3 Drawing Sheets

(51) Int. Cl.
  *C25D 3/38*    (2006.01)
  *H01M 4/13*    (2010.01)
  *H01M 4/66*    (2006.01)
  *H01M 10/052*   (2010.01)

(52) U.S. Cl.
  CPC .......... *H01M 4/661* (2013.01); *H01M 10/052* (2013.01); *Y10T 428/12431* (2015.01)

(56) References Cited

U.S. PATENT DOCUMENTS

| | | | | |
|---|---|---|---|---|
| 2011/0171491 | A1* | 7/2011 | Suzuki | C25D 1/04 428/687 |
| 2015/0030873 | A1* | 1/2015 | Cheng | H01M 10/0525 428/606 |
| 2015/0267313 | A1* | 9/2015 | Chou | C25D 1/04 205/50 |
| 2017/0141404 | A1* | 5/2017 | Song | H01M 4/661 |
| 2018/0062199 | A1* | 3/2018 | Kim | H01M 10/0562 |

FOREIGN PATENT DOCUMENTS

| | | |
|---|---|---|
| CN | 106887595 A | 6/2017 |
| EP | 3663438 A1 | 6/2020 |
| JP | H06146066 A | 5/1994 |
| JP | 2004162144 A | 6/2004 |
| JP | 2012140660 A | 7/2012 |
| JP | 2017063185 A | 3/2017 |
| KR | 20150050266 A | 5/2015 |
| KR | 20160102147 A | 8/2016 |
| KR | 20170126775 A | 11/2017 |
| TW | I533496 B | 5/2016 |

OTHER PUBLICATIONS

Written Opinion for related International Application No. PCT/KR2019/001069; report dated Aug. 8, 2019; (5 pages).
Extended European Search Report for related European Application No. 19746587.5; action dated Sep. 16, 2021; (8 pages).
Chinese Office Action for related Chinese Application No. 2019800106242; action dated Dec. 17, 2021; (15 pages).

* cited by examiner (a)

(b)

(a)

(b)

ELECTROLYTIC COPPER FOIL HAVING EXCELLENT HANDLING CHARACTERISTICS IN POSTPROCESSING, AND MANUFACTURING METHOD THEREFOR

CROSS-REFERENCE TO RELATED APPLICATIONS

The present application is a National Stage of International Application No. PCT/KR2019/001069, filed Jan. 25, 2019, which claims priority to Korean Application No. 10-2018-0012179, filed on Jan. 31, 2018, the disclosure of which are incorporated herein by reference.

FIELD OF THE INVENTION

The present disclosure relates to an electrolytic copper foil, and more particularly to an electrolytic copper foil exhibiting excellent handling characteristics in a process of manufacturing a copper foil and a subsequent process of manufacturing a secondary battery.

BACKGROUND OF THE INVENTION

With increased use of portable electronic devices, such as mobile phones and laptop computers, and the propagation of hybrid electric vehicles, the demand for lithium secondary batteries has abruptly increased.

In a lithium secondary battery, an electrolytic copper foil is mainly used for the material of a negative electrode current collector. The electrolytic copper foil is manufactured through a foil manufacturing process using an electroplating method. In the case in which production conditions are not precisely controlled at the time of manufacturing the electrolytic copper foil, a large number of curls, wrinkles, or tears, which are caused when a thin film is manufactured, may occur. Such defects of copper foil products are a prime cause of increased manufacturing costs at the time of producing copper foils. In addition, curls and wrinkles are a prime cause of the deterioration of the quality of lithium secondary batteries and of the increase in total quality-control expenses.

Conventionally, the range of roughness of a copper foil is controlled to be uniform in order to reduce the incidence of defects of the copper foil products. As a copper foil having a thickness of 10 μm or less is increasingly used as a negative electrode current collector for a lithium secondary battery in order to increase the capacity of the lithium secondary battery, however, curls, wrinkles, or tears still occur even though the roughness of the copper foil is precisely controlled.

Related art document

1. Korean Patent Application No. 10-2015-62228

BRIEF DESCRIPTION OF THE INVENTION

Therefore, the present disclosure relates to an electrolytic copper foil that is capable of preventing problems resulting from limitations and shortcomings of the related art described above and a method of manufacturing the same.

It is an object of the present disclosure to provide an electrolytic copper foil configured such that the possibility of the electrolytic copper foil being curled, wrinkled, and/or torn is reduced in a process of manufacturing the electrolytic copper foil and/or a subsequent process of manufacturing a secondary battery.

It is another object of the present disclosure to provide a method of manufacturing an electrolytic copper foil configured such that the possibility of the electrolytic copper foil being curled, wrinkled, and/or torn is reduced in a process of manufacturing the electrolytic copper foil and/or a subsequent process of manufacturing a secondary battery.

In accordance with an aspect of the present disclosure, the above and other objects can be accomplished by the provision of an electrolytic copper foil having a first surface and a second surface, wherein the texture coefficient of (220) plane of the electrolytic copper foil defined by Equation 1 below is 0.4 to 1.32, $$TC(220) = \frac{\frac{I(220)}{I_0(220)}}{\frac{1}{n}\sum \frac{I(hkl)}{I_0(hkl)}} \quad \text{(Equation 1)}$$

the difference ($|\Delta(Rz/Ra)|$) between Rz/Ra at the first surface of the electrolytic copper foil and Rz/Ra at the second surface of the electrolytic copper foil is less than 2.42, and the difference ($|\Delta PD|$) between the peak density (PD) at the first surface of the electrolytic copper foil and the peak density (PD) at the second surface of the electrolytic copper foil is 96 ea or less.

The second surface may be an M surface, and Rz/Ra at the second surface may be 4.2 to 9.0. In addition, the first surface may be an S surface, and Rz/Ra at the S surface of the electrolytic copper foil may be 5.1 to 6.8.

In accordance with another aspect of the present disclosure, there is provided a method of manufacturing an electrolytic copper foil by applying electric current between a positive electrode plate and a rotary negative electrode drum, disposed in an electrolytic solution in an electrolytic bath so as to be spaced apart from each other, in order to electroplate a copper film on the rotary negative electrode drum, the method including buffing the surface of the rotary negative electrode drum using a brush having a grit of 500 # to 3000 #, electrodepositing a copper film on the buffed rotary negative electrode drum, and winding the electrodeposited copper film, wherein the electrolytic solution includes 70 to 90 g/L of copper ions, 80 to 120 g/L of sulfuric acid, 10 to 20 ppm of chlorine ions, 3 to 12 ppm of a sulfide-based compound, 25 to 50 ppm of molybdenum (Mo), and 5 to 25 ppm of polyethylene glycol (PEG).

The sulfide-based compound may be selected from the group consisting of bis-(sodium sulfopropyl) disulfide (SPS), 3-mercapto 1-propane sulfonate (MPS), and 3-(benzothiazolyl-2-mercapto)-propyl-sulfonate (ZPS). The sulfide-based compound may be SPS.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE INVENTION

Reference will now be made in detail to the preferred embodiments of the present disclosure, examples of which are illustrated in the accompanying drawings.

Figure 1:
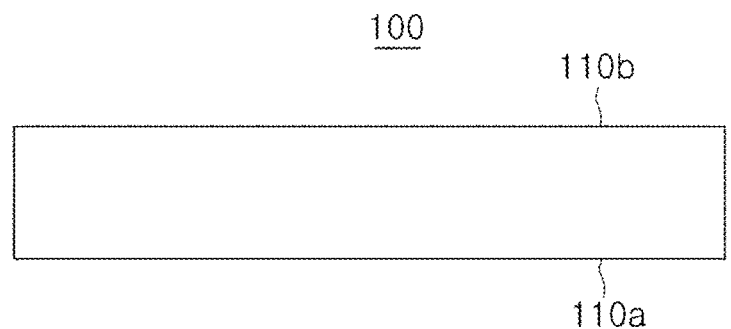
FIG. 1 is a sectional view schematically showing an electrolytic copper foil according to an embodiment of the present disclosure.

FIG. 1 is a sectional view schematically showing an electrolytic copper foil according to an embodiment of the present disclosure.

Referring to FIG. 1, the electrolytic copper foil, denoted by reference numeral 100, has a first surface 110a and a second surface 110b.

In the present disclosure, the electrolytic copper foil 100 has a predetermined thickness, for example, a thickness of 4 to 30 μm. In the case in which the thickness of the copper foil is less than 4 μm, workability in a battery manufacturing process is deteriorated. In the case in which the thickness of the copper foil is greater than 30 μm, it is difficult to realize high capacity of a lithium secondary battery at the time of manufacturing the lithium secondary battery due to the great thickness of the copper foil.

The electrolytic copper foil 100 is formed on a rotary negative electrode drum by electroplating. The electrolytic copper foil 100 has a shiny surface (an S surface), which is the surface that is in direct contact with the rotary negative electrode drum during electroplating, and a matte surface (an M surface), which is opposite the shiny surface. For example, in the present disclosure, the first surface may be the S surface, and the second surface may be the M surface.

In order to inhibit the occurrence of wrinkles, curls, and tears, the electrolytic copper foil 100 according to the present disclosure has a controlled surface texture factor and a controlled surface shape factor.

As the surface texture factor, it is preferable for the electrolytic copper foil to have a crystalline structure that is controlled such that a texture coefficient TC of (220) plane is within a specific range. In the present disclosure, the texture coefficient TC of (220) plane is expressed by Equation 1 below.

$$TC(220) = \frac{\frac{I(220)}{I_0(220)}}{\frac{1}{n}\sum \frac{I(hkl)}{I_0(hkl)}} \quad \text{Equation 1}$$

In Equation 1 above, I(hkl) indicates the XRD diffraction intensity of (hkl) crystal plane of a sample, and $I_0$ (hkl) indicates the diffraction intensity of (hkl) crystal plane of standard copper powder, set forth by the Joint Committee on Powder Diffraction Standards (JCPDS) (X-ray light source: Cu $K_{a1}$). Also, in Equation 1, 1 to n indicate the number of diffraction peaks within a specific range of diffraction angle 2θ. In the present disclosure, the texture coefficient is obtained from an X-ray diffraction pattern within a range of diffraction angle 2θ between 30 degrees and 95 degrees, and remarkable crystal planes that are considered are (111), (200), (220), and (311) planes (that is, n=4). Consequently, the texture coefficient of (220) plane indicates the ratio of the peak intensity of (220) plane normalized with the peak intensity of standard Cu to the average peak intensity of (111), (200), (220), and (311) planes normalized with the peak intensity of standard Cu in the X-ray diffraction pattern of the sample.

In the present disclosure, it is preferable for the electrolytic copper foil 100 to have a (220) texture coefficient of 0.40 to 1.32 on both the first surface 110a and the second surface 110b. In the case in which the (220) texture coefficient is less than 0.40, as will be described below, the crystal texture of the copper foil is not dense. As a result, the texture of the copper foil is deformed by stress and heat applied thereto in a battery manufacturing process, whereby wrinkles are formed in the copper foil. Also, in the case in which the (220) texture coefficient is greater than 1.32, the texture of the copper foil is excessively dense. As a result, the copper foil is brittle, whereby the copper foil is torn during the battery manufacturing process.

In the present disclosure, it is preferable for the difference between Rz/Ra at the first surface of the electrolytic copper foil 100 and Rz/Ra at the second surface of the electrolytic copper foil 100, i.e. |Δ(Rz/Ra)|, which is the surface shape factor, to be less than 2.42. Here, Rz indicates ten-point average roughness, and Ra indicates arithmetical average roughness. Also, in the present disclosure, it is preferable for the difference between the peak density PD at the first surface of the electrolytic copper foil and the peak density PD at the second surface of the electrolytic copper foil, i.e. |ΔPD|, to be 96 ea or less.

In the present disclosure, Rz and Ra may be measured according to JIS B 0601(2001) standards, and PD may be measured according to ASME B46.1 standards.

In the present disclosure, in the case in which |Δ(Rz/Ra)| and |ΔPD| at the opposite surfaces of the electrolytic copper foil deviate from the above numerical ranges, curls are formed in the electrolytic copper foil due to the difference in the surface properties between the opposite surfaces of the electrolytic copper foil.

In addition, it is preferable for Rz/Ra at the M surface of the electrolytic copper foil to be within the range from 4.2 to 9.0. In the case in which Rz/Ra is less than 4.2, the specific surface area of the copper foil that is capable of contacting a negative electrode active material is small, whereby it is difficult to realize sufficient force of coupling with a negative electrode active material. In the case in which Rz/Ra is greater than 9.0, the surface of the electrolytic copper foil is nonuniform, whereby the negative electrode active material may not be uniformly attached to the surface of the copper foil.

In the present disclosure, it is preferable for the electrolytic copper foil to have a tensile strength, measured at room temperature (25±15° C.), of 30 to 65 kgf/mm². In the case in which the tensile strength is less than 30 kgf/mm², the electrolytic copper foil may be easily deformed by the force applied thereto during the manufacturing process. Also, in the case in which the tensile strength is greater than 65 kgf/mm², the electrolytic copper foil is highly brittle. As a result, the electrolytic copper foil may be torn by pressure locally applied thereto in a subsequent process of manufacturing a lithium secondary battery, whereby workability is deteriorated. In the present disclosure, the tensile strength of an electrolytic copper foil may be measured using a universal testing machine (UTM) according to the guidelines set forth in the IPC-TM-650 Test Method Manual. In an embodiment of the present disclosure, the tensile strength of an electrolytic copper foil is measured using a universal testing machine from Instron Company. The tensile strength of an electrolytic copper foil is measured under the conditions in which the width of the sample is 12.7 mm, the distance between grips is 50 mm, and the measurement speed is 50 mm/min. For evaluation, the tensile strength of an electrolytic copper foil may be repeatedly measured three times, and the average of the measured tensile strengths may be taken as the tensile strength of the electrolytic copper foil.

Also, in the present disclosure, it is preferable for the electrolytic copper foil to have an elongation, measured at room temperature (25±15° C.), of 3% or more. In the case in which the elongation is less than 3%, the electrolytic copper foil may not extend but may rupture due to volumetric expansion of the electrolytic copper foil during charging and discharging of the cylindrical battery in the case in which the electrolytic copper foil is applied to the cylindrical battery. Here, the room-temperature elongation is the elongation when the test sample ruptures under the above-described tensile strength measurement conditions.

In addition, it is preferable for the electrolytic copper foil according to the present disclosure to have a lateral weight deviation of 5% or less. In the case in which the lateral weight deviation of the electrolytic copper foil is greater than 5%, the electrolytic copper foil may locally extend due to weight overlap between the copper foil and a bobbin when the electrolytic copper foil is wound around the bobbin, whereby the electrolytic copper foil may be wrinkled. In the present disclosure, the lateral weight deviation of the electrolytic copper foil is realized by cutting a copper foil into an area of 5 cm×5 cm in order to manufacture a sample, measuring the weight of the sample, converting the measured weight of the sample into a weight value of the copper foil per unit area, repeatedly performing the sample cutting process in the lateral direction of the copper foil, measuring the copper foil weight value of each sample, and calculating the standard deviation.

Figure 2:
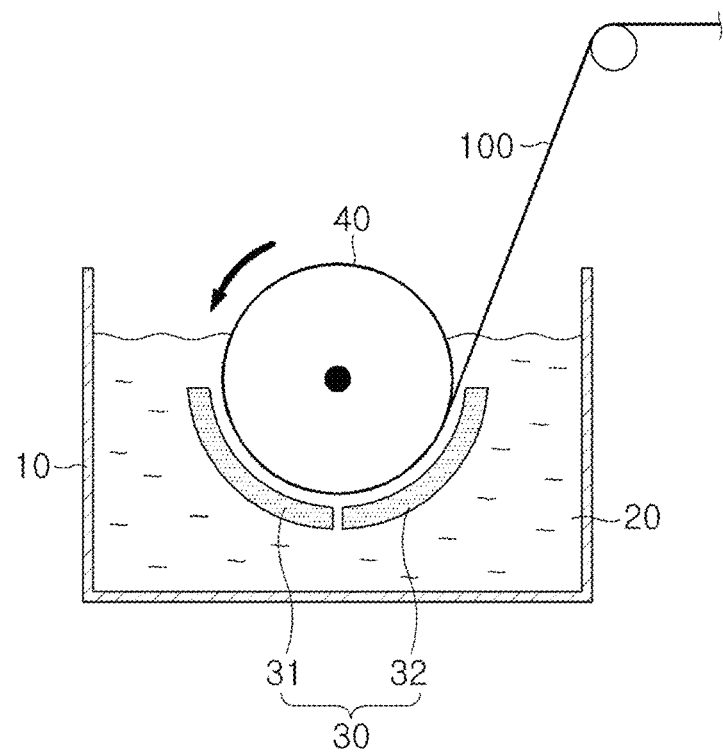
FIG. 2 is a view schematically showing an apparatus for manufacturing the electrolytic copper foil according to the present disclosure.
Figure 3:
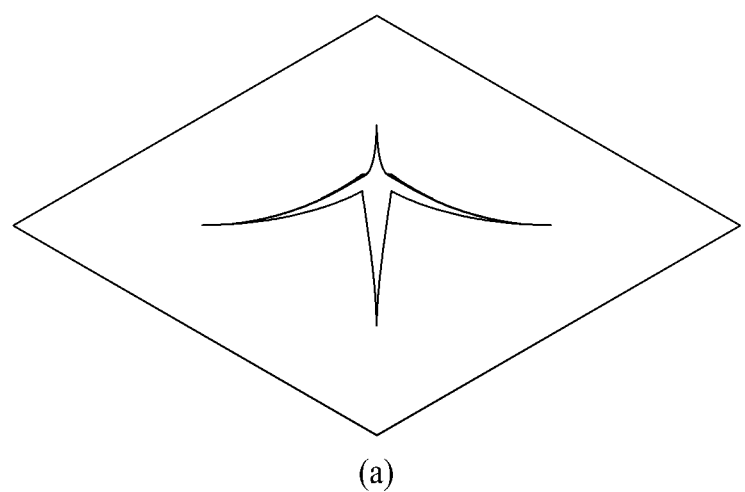
FIG. 3 is a photograph showing a method of measuring the value of a curl in an embodiment of the present disclosure.
Figure 3:
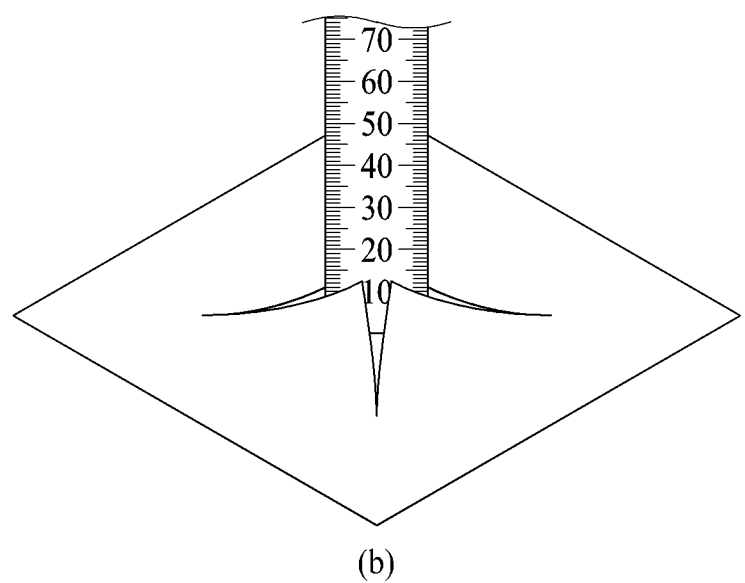

FIG. 2 is a view schematically showing an apparatus for manufacturing the electrolytic copper foil according to the present disclosure.

As shown in FIG. 2, a positive electrode plate 30 and a rotary negative electrode drum 40 are disposed in an electrolytic solution 20 in an electrolytic bath 10 so as to be spaced apart from each other. In the case in which electric power is applied between the rotary negative electrode drum 40 and the positive electrode plate 30 while the rotary negative electrode drum 40 is rotated in a predetermined direction, plating is performed through electric conduction via the electrolytic solution 20. A copper film 100 plated on the surface of the rotary negative electrode drum 40 is wound while being guided by a guide roll.

A copper sulfate electrolytic solution, a copper pyrophosphate electrolytic solution, or a copper sulfamate electrolytic solution may be used as the electrolytic solution 20, which deposits the electrolytic copper foil. In the present disclosure, a copper sulfate electrolytic solution is very suitable as the electrolytic solution, and this is preferably used.

The positive electrode plate 30 may include a first positive electrode plate 31 and a second positive electrode plate 32, which are electrically insulated from each other. The density of the electric current that is supplied by the positive electrode plate 30, i.e. the first positive electrode plate 31 and the second positive electrode plate 32, may be 40 to 80 A/dm².

In an embodiment of the present disclosure, the electrolytic solution 20 may include 70 to 90 g/L of copper ions, 80 to 120 g/L of sulfuric acid, and 10 to 30 ppm of chlorine ions.

In addition, the electrolytic solution 20 may further include an additive, such as a brightener or a leveling agent. In the present disclosure, the additive may include at least one sulfide-based compound selected from the group consisting of bis-(sodium sulfopropyl) disulfide (SPS), 3-mercapto 1-propane sulfonate (MPS), and 3-(benzothiazolyl-2-mercapto)-propyl-sulfonate (ZPS). Preferably, SPS is used. In the present disclosure, in the case in which the concentration of the sulfide-based compound is greater than 12 ppm, plating is minute, and the (220) texture coefficient deviates from the preferable upper limit. In the case in which the concentration of the sulfide-based compound is less than 32 ppm, on the other hand, the size of plated crystal particles is large, and the (111) texture is developed while the (220) texture is less developed, whereby the texture coefficient deviates from the preferable lower limit.

In the present disclosure, the rotary negative electrode drum 40 has a surface profile that is suitable for controlling the surface profile of the S surface of the electrolytic copper foil. Since the S surface of the electrolytic copper foil contacts the drum, the profile of the S surface of the electrolytic copper foil is affected by the surface structure of the drum. Specifically, in the present disclosure, the surface structure of the drum may be controlled by buffing the surface of the drum. For example, in the case in which the surface of the drum is buffed using a brush having a grit of 500 # to 3000 #, the range of Rz/Ra of the S surface of the electrodeposited electrolytic copper foil is 5.1 to 6.8, which indicates a value having little fluctuation. In the case in which the surface of the drum is buffed using a brush having a grit of greater than 3000 #, on the other hand, the surface profile of the drum is lowered, which causes uniform electrodeposition of copper. Consequently, the Rz value of the S surface converges to the Ra value. As a result, the difference in Rz/Ra between the M surface and the S surface increases.

In addition, the buffing of the surface of the drum may affect the peak density PD. In the case in which the surface of the drum is buffed using a brush having a grit of 500 # to 3000 #, however, it is possible to obtain an electrolytic copper foil, the peak density of the S surface of which is a relatively uniform value of 10 to 20 ea.

In the present disclosure, the surface profile of the M surface of the electrolytic copper foil may be further controlled as follows.

First, in the present disclosure, the concentration of Mo in the electrolytic solution is maintained at 25 to 50 ppm. In the case in which the concentration of Mo in the electrolytic solution is greater than 50 ppm, copper is nonuniformly plated, whereby Rz of the M surface of the copper foil abruptly increases. As a result, the Rz/Ra value becomes higher than in the case of the S surface, and the difference in the Rz/Ra value between the opposite surfaces of the copper foil deviates from the preferable upper limit. In the case in which the concentration of Mo in the electrolytic solution is less than 25 ppm, on the other hand, Mo does not serve as a uniform additive over the entire surface of the drum, which causes locally nonuniform plating. As a result, the M surface of the copper foil is stained or nonuniformly electroplated. As the result of such stains or nonuniform plating, a negative electrode material is nonuniformly applied in a subsequent process of manufacturing a lithium secondary battery, whereby the capacity of the lithium secondary battery is reduced.

Also, in the present disclosure, the concentration of polyethylene glycol (PEG), which is used as the leveling agent, may be controlled in order to maintain the surface profile of the M surface within a preferable range. In the present disclosure, the concentration of polyethylene glycol in the electrolytic solution may be adjusted to fall within the range of 5 to 25 ppm. In the case in which the concentration of PEG is less than 5 ppm, copper is not levelly electrodeposited at the time of plating, whereby the copper foil has a surface structure with developed micro-scale irregularities. As a result, the PD value of the M surface of the copper foil becomes high, whereby the difference in the PD value between the M surface and the S surface increases. In the case in which the concentration of PEG is greater than 25 ppm, on the other hand, copper plating is levelly electrodeposited in the electrolytic solution, whereby Rz/Ra has a value of less than 4.2

In the present disclosure, it is preferable for the electrolytic solution 20 to be maintained at 45 to 65° C. and for the flow rate of the electrolytic solution 20 that is supplied into the electrolytic bath 10 to be maintained at 35 to 46 m³/hour. In the case in which the flow rate of the electrolytic solution 20 is less than 35 m³/hour, copper ions are not sufficiently supplied to the surface of the rotary negative electrode drum 40, whereby a plated thin film is nonuniformly formed. In the case in which the flow rate of the electrolytic solution 20 is greater than 46 m³/hour, on the other hand, the flow speed of the electrolytic solution 20, which also passes through a filter, is excessively fast, which abruptly reduces the lifespan of the filter.

Hereinafter, preferred examples of the present disclosure will be described in detail.

<Manufacture of Electrolytic Copper Foil>

A positive electrode plate and a rotary negative electrode drum, disposed in an electrolytic solution in an electrolytic bath so as to be spaced apart from each other, were electrically conducted using an apparatus identical to that shown in FIG. 2 in order to form a copper film on the rotary negative electrode drum.

SPS, Mo, and PEG were added to a solution including 75 g/L of copper ions, 100 g/L of sulfuric acid, and 20 ppm of chlorine ions in order to prepare an electrolytic solution. The copper film was electrodeposited while the content of SPS, Mo, and PEG in the electrolytic solution was changed. At this time, the temperature of the electrolytic solution was maintained at about 55° C., the current density of the electrolytic solution was 60 A/dm², and the flow rate of the electrolytic solution was 40 m³/hr. Also, in order to obtain different surface profiles at the S surface of the copper foil before the manufacture of the copper foil, the surface of the rotary negative electrode drum was buffed using brushes having different grits (different degrees of roughness), and then experiments were carried out.

The manufacturing conditions of the manufactured copper foil are shown in Table 1 below.

TABLE 1

| | SPS (ppm) | Mo (ppm) | PEG (ppm) | Brush (#) |
|---|---|---|---|---|
| Example 1 | 3 | 25 | 15 | 2000 |
| Example 2 | 12 | 25 | 15 | 2000 |
| Example 3 | 7 | 49 | 15 | 2000 |
| Example 4 | 7 | 25 | 5 | 2000 |
| Comparative Example 1 | 2 | 25 | 15 | 2000 |
| Comparative Example 2 | 13 | 25 | 26 | 2000 |

TABLE 1-continued

| | SPS (ppm) | Mo (ppm) | PEG (ppm) | Brush (#) |
|---|---|---|---|---|
| Comparative Example 3 | 7 | 51 | 15 | 2000 |
| Comparative Example 4 | 7 | 25 | 4 | 2000 |
| Comparative Example 5 | 7 | 25 | 15 | 4000 |

Subsequently, the properties of the manufactured electrolytic copper foil samples (Examples 1 to 4 and Comparative Examples 1 to 5) were measured. The respective properties of the electrolytic copper foil samples were measured as follows.

Texture Coefficient

The X-ray diffraction pattern of the M surface of each of the manufactured electrolytic copper foil samples was obtained within a range of diffraction angle 2θ between degrees and 95 degrees, and the ratio of the peak intensity of (220) plane normalized with the peak intensity of standard Cu to the average peak intensity of (111), (200), (220), and (311) planes, which were crystal planes, normalized with the peak intensity of standard Cu was obtained as the texture coefficient of (220) plane.

Surface Profile of Copper Foil

Rz and Ra were measured according to JIS B 0601 (2001) standards using a stylus tip from Mitutoyo Company, the model name of which was SJ-310 and which had a radius of 2 μm, under a condition of a measurement pressure of 0.75 mN. At this time, the measurement length, excluding the cut-off length, was 4 mm, the cut-off length was 0.8 mm at the first stage and the last stage, and the average of the values obtained by performing the measurement three times was taken.

The peak density PD was measured according to ASME Bb 46.1 standards, and the peak density was measured using a roughness tester from Mahr Company (Model name: Marsurf M300) and a stylus tip having a radius of 2 μm. The peak count level was ±0.5 μm from the center line of the profile, the measurement length, excluding the cut-off length, was 4 mm, and the cut-off length was 0.8 mm at the first stage and the last stage. The measurement pressure was 0.7 mN. The average of the values obtained by performing the measurement three times was taken as the peak density.

Curls

An incision was made in the shape of a cross having a size of 8 cm×8 cm at an arbitrary point on the M surface of each of the electrolytic copper foils manufactured according to Examples and Comparative Examples so as to be vertically divided into two parts in order to form four incision portions. After incision, the heights of the corners of the four incision portions that protruded sharply were measured, and the arithmetic mean of the measured heights was taken as the curl.

Wrinkles and Tears

Figure 4:
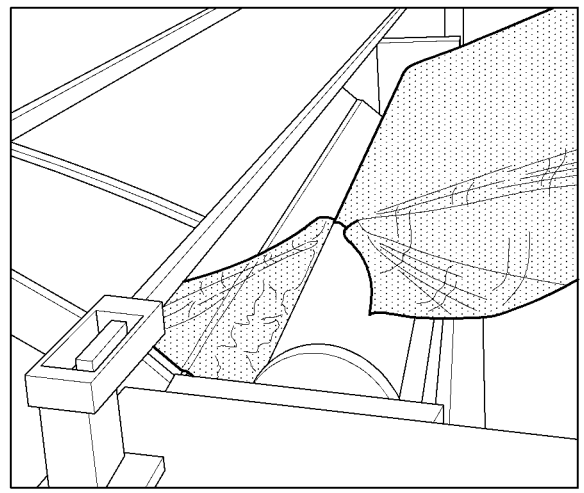
FIGS. 4(a) and 4(b) are photographs illustrating a tear-occurrence state and a wrinkle-occurrence state, respectively.
Figure 4:

Whether each of the electrolytic copper foils was wrinkled and torn during a roll-to-roll process was observed with the naked eye. FIGS. 4(a) and 4(b) are photographs illustrating a tear-occurrence state and a wrinkle-occurrence state, respectively.

<Manufacture of Negative Electrode>

A current collector having a width of 10 cm was prepared using each of the electrolytic copper foils manufactured according to Examples and Comparative Examples. On the current collector, 2 wt % of styrene butadiene rubber (SBR) and 2 wt % of carboxymethyl cellulose (CMC) were mixed with 100 wt % of artificial graphite and SiO2, marketed as a negative electrode active material, using distilled water as a solvent in order to manufacture a slurry.

Subsequently, a sample of each of the electrolytic copper foils to be measured was placed on a glass plate having a clean surface and was spread so as to remove any wrinkle or crumple. A negative electrode material was coated on the copper foil using a bar coater such that the amount of the negative electrode material that was loaded was 9.0±0.5 mg/cm$^2$. At this time, the coating speed of the bar coater was 10 to 15 mm/s. The copper foil having the negative electrode material coated thereon was placed in a dry oven heated to 100° C., and was dried for 15 minutes. The dried copper foil sample was pressed in four stages using a roll press such that the density of an electrode was 1.55±0.05 g/cc in order to manufacture a negative electrode. The adhesion force of the manufactured negative electrode was measured using the following method.

The manufactured electrode was cut to obtain a sample having a size of 10 mm (width)×100 mm (length), and the active material portion of the sample was adhered to a reinforcement plate using a double-sided tape. At this time, all of the samples that were manufactured were attached using uniform force. The adhesive force (adhesion force) of the manufactured samples was measured using an UTM apparatus.

Crosshead speed: 50.0 mm/min
Measurement length: 20 to 50 mm
90° peeling test
<Manufacture of Lithium Secondary Battery>

1 M of LiPF$_6$, serving as a solute, was dissolved in a non-aqueous organic solvent, obtained by mixing ethylene carbonate (EC) and ethyl methyl carbonate (EMC) with each other at a ratio of 1:2, in order to prepare a basic electrolytic solution, and 99.5 wt % of the basic electrolytic solution and 0.5 wt % of succinic anhydride were mixed with each other in order to manufacture a non-aqueous electrolytic solution.

A lithium manganese oxide, such as $Li_{1.1}Mn_{1.8}5Al_{0.05}O_4$, and a lithium manganese oxide having an orthorhombic crystalline structure, such as o-LiMnO$_2$, were mixed with each other at a weight ratio of 90:10 in order to manufacture a positive electrode active material. The positive electrode active material, carbon black, and polyvinylidene fluoride (PVDF), serving as a binder, were mixed with each other at a weight ratio of 85:10:5 in NMP, serving as an organic solvent, in order to manufacture a slurry. The manufactured slurry was applied to opposite surfaces of an Al foil having a thickness of 20 µm and was dried in order to manufacture a positive electrode. A lithium secondary battery was obtained using the manufactured positive electrode, negative electrode, and electrolytic solution.

Table 2 below shows the results of measurement of the physical properties of the electrolytic copper foil samples manufactured according to Examples of the present disclosure and the results of measurement of the adhesion forces of the negative electrodes manufactured using the electrolytic copper foils.

TABLE 2

|  | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Texture coefficient | 0.4 | 1.32 | 0.78 | 0.78 | 0.32 | 1.41 | 0.78 | 0.78 | 0.78 |
| \| Δ (Rz/Ra) \| | 0.85 | 0.85 | 2.42 | 0.85 | 0.85 | 0.85 | 2.43 | 0.85 | 2.43 |
| Rz/Ra (M surface) | 4.22 | 4.21 | 9.00 | 4.21 | 4.21 | 4.08 | 9.13 | 4.22 | 4.22 |
| Rz/Ra (S surface) | 3.37 | 3.36 | 6.58 | 3.36 | 3.36 | 3.23 | 6.70 | 3.37 | 1.79 |
| \| ΔPD \| (ea/cm) | 38 | 38 | 38 | 96 | 38 | 38 | 38 | 97 | 38 |
| M surface PD (ea/cm) | 48 | 48 | 48 | 105 | 48 | 48 | 48 | 107 | 48 |
| S surface PD (ea/cm) | 10 | 10 | 10 | 9 | 10 | 10 | 10 | 10 | 10 |
| Curl (mm) | 5.6 | 5.5 | 8.7 | 8.6 | 5.2 | 5.4 | 11.5 | 11.6 | 11.6 |
| Wrinkle | no | no | no | no | yes | no | no | no | no |
| Tear | no | no | no | no | no | yes | no | no | no |
| Adhesion force (N/m) | 26.4 | 26.4 | 28.4 | 26.4 | 26.8 | 15.5 | 15.4 | 26.7 | 26.3 |

Referring to Table 2, all of the electrolytic copper foil samples manufactured according to Examples 1 to had excellent curl values of 10 mm or less. An electrolytic copper foil having a curl value in this range is not folded in a process of manufacturing a copper foil or a subsequent process of manufacturing a battery. Meanwhile, in the case of Comparative Example 1 and Comparative Example 2, |Δ(Rz/Ra)| and |ΔPD| of the electrolytic copper foil samples were similar to those of the electrolytic copper foil samples manufactured according to Examples; however, the electrolytic copper foil samples were wrinkled or torn during a roll-to-roll process. The reason for this is that the (220) texture coefficient of each of the electrolytic copper foil samples manufactured according to Comparative Example 1 and Comparative Example 2 had a value of less than 0.40, whereby the crystal texture of the copper foil was not dense, and therefore the texture of the copper foil was deformed by stress and heat during a battery manufacturing process, with the result that wrinkles were formed in the copper foil or that the (220) texture coefficient of each of the electrolytic copper foil samples was greater than 1.32, whereby the texture of the copper foil was excessively dense, with the result that the copper foil was brittle.

Meanwhile, it can be seen that Rz/Ra of the M surface of the electrolytic copper foil manufactured according to Comparative Example 3 had a very high value (9.13), whereby |Δ(Rz/Ra)| was greater than 2.42, which was a high curl value. In addition, in the case of Comparative Example 4, it can be seen that the content of PEG was small, whereby the electrolytic copper foil had a surface structure with developed micro-scale irregularities, and therefore the PD value of the M surface of the copper foil increased (97 ea), with the result that the curl value increased. Meanwhile, Rz/Ra of the S surface of the electrolytic copper foil manufactured according to Comparative Example 5 had a very low value, and |Δ(Rz/Ra)| was greater than 2.42, which were caused by the surface profile of the rotary negative electrode drum.

Meanwhile, in the case of Comparative Examples 2 and 3, each of the manufactured negative electrodes had a low value of adhesion force. In the case in which the adhesion force is less than 20 N/m, the negative electrode material may be separated from the surface of the copper foil at the time of charging and discharging a lithium secondary battery after the manufacture of the lithium secondary battery, whereby the charge capacity of the lithium secondary battery may be abruptly reduced. In the case of Comparative Examples 2 and 3, the (220) texture coefficient of each of the electrolytic copper foil samples was low, or Rz/Ra of the M surface of each of the electrolytic copper foil samples was low, whereby the force of coupling with the negative electrode material was insufficient. The reason for this is that the crystal texture of the copper foil was not dense or that the specific surface area of the copper foil was low.

As is apparent from the above description, according to the present disclosure, it is possible to provide an electrolytic copper foil configured such that the possibility of the electrolytic copper foil being curled, wrinkled, and/or torn is reduced in a process of manufacturing the electrolytic copper foil and/or a subsequent process of manufacturing a secondary battery by controlling the surface profile of a rotary negative electrode drum, the surface texture structure of a copper foil, and the surface profile of the copper foil.

It will be apparent to those skilled in the art that the present disclosure described above is not limited by the above-described embodiments and the accompanying drawings and that various substitutions, modifications, and variations can be made in the present disclosure without departing from the spirit or scope of the disclosures. Consequently, the scope of the present disclosure is defined by the accompanying claims, and it is intended that all variations or modifications derived from the meaning, scope, and equivalent concept of the claims fall within the scope of the present disclosure.

What is claimed is:

1. An electrolytic copper foil having a first surface and a second surface, wherein
a texture coefficient of (220) plane of the electrolytic copper foil defined by Equation 1 below is 0.4 to 1.32, $$TC(220) = \frac{\frac{I(220)}{I_0(220)}}{\frac{1}{n}\sum \frac{I(hkl)}{I_0(hkl)}} \qquad \text{(Equation 1)}$$

a difference (|Δ(Rz/Ra)|) between Rz/Ra at the first surface of the electrolytic copper foil and Rz/Ra at the second surface of the electrolytic copper foil is less than 2.42, and
a difference (|ΔPD|) between a peak density (PD) at the first surface of the electrolytic copper foil and a peak density (PD) at the second surface of the electrolytic copper foil is 96 ea or less.

2. The electrolytic copper foil according to claim 1, wherein
the second surface is an M surface, and
Rz/Ra at the second surface is 4.2 to 9.0.

3. The electrolytic copper foil according to claim 2, wherein
the first surface is an S surface, and
Rz/Ra at the S surface of the electrolytic copper foil is 5.1 to 6.8.

4. The electrolytic copper foil according to claim 1, wherein the electrolytic copper foil has a tensile strength, measured at room temperature, of 30 to 65 kgf/mm$^2$.

5. The electrolytic copper foil according to claim 1, wherein the electrolytic copper foil has an elongation, measured at room temperature, of 3% or more.

6. The electrolytic copper foil according to claim 1, wherein the electrolytic copper foil has a lateral weight deviation of 5% or less.

7. The electrolytic copper foil according to claim 1, wherein an arithmetic mean of measured heights of corners of four protruding incision portions of the electrolytic copper foil, formed by incising electrolytic copper foil in a form of a cross having a size of 8 cm×8 cm so as to be vertically divided into two parts, is less than 10 mm.

8. The electrolytic copper foil of claim 1, wherein the electrolytic copper foil is manufactured by:
buffing a surface of a rotary negative electrode drum using a brush having a grit of 500 # to 3000 #;
electrodepositing the copper foil on the buffed rotary negative electrode drum by applying electric current between a positive electrode plate and the buffed rotary negative electrode drum, wherein the positive electrode plate and the buffed rotary negative electrode drum are disposed in an electrolytic solution and spaced apart from each other; and
winding the electrodeposited copper foil,
wherein the electrolytic solution comprises 70 to 90 g/L of copper ions, 80 to 120 g/L of sulfuric acid, 10 to 20 ppm of chlorine ions, 3 to 12 ppm of a sulfide-based compound, 25 to 50 ppm of molybdenum (Mo), and 5 to 25 ppm of polyethylene glycol (PEG).

9. The electrolytic copper foil of claim 8, wherein the sulfide-based compound is selected from a group consisting of bis-(sodium sulfopropyl) disulfide (SPS), 3-mercapto 1-propane sulfonate (MPS), and 3-(benzothiazolyl-2-mercapto)-propyl-sulfonate (ZPS).

10. The electrolytic copper foil of claim 8, wherein the sulfide-based compound is SPS.

* * * * *